United States Patent
Norrga et al.

(10) Patent No.: US 9,019,732 B2
(45) Date of Patent: Apr. 28, 2015

(54) HIGH VOLTAGE DC/DC CONVERTER

(75) Inventors: Staffan Norrga, Stockholm (SE);
Konstantinos Papastergiou, Geneva (CH); Sasitharan Subramanian, Tamil Nadu (IN); Tomas Jonsson, Västerås (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/130,852

(22) PCT Filed: Jul. 4, 2011

(86) PCT No.: PCT/EP2011/061172
§ 371 (c)(1),
(2), (4) Date: Feb. 5, 2014

(87) PCT Pub. No.: WO2013/004282
PCT Pub. Date: Jan. 10, 2013

(65) Prior Publication Data
US 2014/0140104 A1    May 22, 2014

(51) Int. Cl.
*H02M 3/28* (2006.01)
*H02M 3/335* (2006.01)
*H02J 3/36* (2006.01)
*H02M 1/00* (2006.01)
*H02M 7/483* (2007.01)

(52) U.S. Cl.
CPC .............. *H02M 3/3353* (2013.01); *H02J 3/36* (2013.01); *H02M 3/33584* (2013.01); *H02M 2001/0074* (2013.01); *H02M 2007/4835* (2013.01); *Y02E 60/60* (2013.01); *H02M 3/335* (2013.01)

(58) Field of Classification Search
CPC .............. H02M 3/28; H02M 3/33507; H02M 3/33569; H02M 3/335; H02M 3/3376; H02M 7/068; H02M 7/08; H02M 7/19; H02M 7/493; Y02B 70/126; H02J 1/102
USPC .................. 363/15–17, 65–71; 323/332–336; 7/15–17, 65–71
See application file for complete search history.

(56) References Cited

U.S. PATENT DOCUMENTS

| | | | |
|---|---|---|---|
| 6,519,169 B1 * | 2/2003 | Asplund et al. | 363/132 |
| 7,269,037 B2 * | 9/2007 | Marquardt | 363/71 |
| 2002/0024824 A1 | 2/2002 | Reinold | |

(Continued)

FOREIGN PATENT DOCUMENTS

| | | |
|---|---|---|
| CN | 101707443 A | 5/2010 |
| CN | 101867304 A | 10/2010 |
| EP | 1 184 963 A2 | 3/2002 |
| EP | 1 589 648 A2 | 10/2005 |

(Continued)

*Primary Examiner* — Jessica Han
*Assistant Examiner* — Gustavo Rosario Benitez
(74) *Attorney, Agent, or Firm* — Birch, Stewart, Kolasch & Birch, LLP

(57) ABSTRACT

It is presented a high voltage DC/DC converter for converting between a first DC connection and a second DC connection. The high voltage DC/DC converter comprises: a first set of DC terminals; a second set of DC terminals); a multiphase transformer device comprising a plurality of primary windings and a corresponding plurality of secondary windings; a first converter arranged to convert DC to AC, comprising a plurality of phase legs serially connected between the first set of DC terminals, wherein each phase leg is connected to an AC connection of a respective primary winding; and a second converter arranged to convert AC from the secondary windings to DC on the second set of DC terminals.

20 Claims, 7 Drawing Sheets

(56) References Cited

U.S. PATENT DOCUMENTS

| | | |
|---|---|---|
| 2005/0017699 A1* | 1/2005 | Stanley .................. 323/282 |
| 2005/0047183 A1* | 3/2005 | Kurio et al. ............... 363/71 |
| 2008/0205093 A1* | 8/2008 | Davies et al. ............. 363/35 |
| 2010/0128498 A1 | 5/2010 | Nymand |
| 2010/0328968 A1 | 12/2010 | Adragna et al. |

FOREIGN PATENT DOCUMENTS

| | | |
|---|---|---|
| WO | WO 00/62409 A1 | 10/2000 |
| WO | WO 2004/082115 A1 | 9/2004 |
| WO | WO 2007/028349 A1 | 3/2007 |
| WO | WO 2010/088969 A1 | 8/2010 |
| WO | WO 2011/029566 A1 | 3/2011 |

* cited by examiner

HIGH VOLTAGE DC/DC CONVERTER

TECHNICAL FIELD

The invention relates to a high voltage DC/DC converter.

BACKGROUND

For HVDC (High Voltage DC) networks, suitable topologies for DC grid interconnectors are being sought, using suitable high voltage DC/DC converters.

WO 2011/029566 A1 discloses DC/DC converter units. Each DC/DC converter unit consists of a conventional full H bridge DC/AC converter block employing suitable power semiconductor switching devices and a diode bridge which operates as a passive rectifier. The DC/AC and AC/DC converter blocks and are provided on each side of a medium or high frequency transformer which provides galvanic isolation. The DC/DC converter units will normally be configured for unidirectional power flow (i.e. from the ac supply network to subsea electrical loads) and there is no requirement for the AC/DC converter block to provide an inverter function.

However, the structure of the presented DC/DC converter is complicated and can only be increased in capacity by adding more links from DC to AC to DC.

SUMMARY

An object is to provide a DC/DC converter with reduced cost and greater flexibility.

In a first aspect, it is presented a high voltage DC/DC converter for converting between a first DC connection and a second DC connection. The high voltage DC/DC converter comprises: a first set of DC terminals; a second set of DC terminals); a multiphase transformer device comprising a plurality of primary windings and a corresponding plurality of secondary windings; a first converter arranged to convert DC to AC, comprising a plurality of phase legs serially connected between the first set of DC terminals, wherein each phase leg comprises a plurality of converter cells (400) and each phase leg is connected to an AC connection of a respective primary winding; and a second converter arranged to convert AC from the secondary windings to DC on the second set of DC terminals.

By providing a plurality of converter cells in each phase leg, greater flexibility is introduced. In particular, more converter cells can be added in series to support higher voltage and/or in parallel to support higher current. More converter cells in series also improve the voltage waveform quality, which thus reduces the need for additional components for filtering, which thus reduces cost.

The second converter may comprise a plurality of bridge legs connected in parallel between the second set of DC terminals, wherein each bridge leg may be connected to a respective AC connection terminal of the plurality of secondary windings.

The second converter may comprise a plurality of phase legs serially connected between the second set of DC terminals, wherein each phase leg may be connected to an AC connection of a respective secondary winding.

The second converter may be controllable to provide a constant DC voltage.

The first converter may be controllable to provide a defined voltage and frequency to the primary windings.

The DC/DC converter may be reversible, allowing bidirectional power transfer.

Each phase leg of the first converter may comprise: a first AC connection terminal and a second AC connection terminal; a phase branch comprising at least two converter cell and having first and second branch end terminals; and a capacitor; wherein the capacitor may be connected the between the first branch end terminal and the first AC connection terminal, the capacitor forming a DC blocking capacitor; the second AC connection terminal may be connected to the second branch end terminal; and wherein the series connection of the phase legs between the first set of DC terminals may be such that a first series connection point in a phase leg is located between the first branch end terminal and the DC blocking capacitor, while a second series connection point may be located between the second branch end terminal and the second AC connection.

The phase branch of each phase leg of the first converter may comprise a cascade of at least two series connected and independently switchable converter cells.

The phase branch of each phase leg of the second converter may comprise at least two parallel connected cascades of converter cells.

The high voltage DC/DC converter may further comprise a control system configured to control the switching of the converter cells of the phase branch of a phase leg of the first converter to provide a voltage according to the following expression between the first and second series connections points of a phase leg:

$$U_k = U_k^{DC} + \hat{U}_v^{AC} \sin(\omega t + \theta_k)$$

where k indicates the $k^{th}$ phase leg, $k \in [1,P]$, P being the number of phases of the first converter 20; $U_k^{DC}$ denotes a predetermined desired DC voltage between the first and second connection points, where $$\sum_{k=1}^{P} U_k^{DC} = U^{DC},$$

$U^{DC}$ being the voltage between the DC connection terminals; $\hat{U}_v^{AC}$ is a desired peak AC voltage between the first and second connection points, t is time, $\omega$ is the desired angular frequency at the AC connection and $\theta_k$ is the desired phase angle.

The predetermined desired DC voltage may correspond to $$\frac{V1}{P},$$

where V1 is the voltage between the DC connection terminals and P is the number of phases of the first converter 20.

At least part of the converter cells may conform to a half bridge structure.

At least part of the converter cells may conform to a full bridge structure.

The word 'plurality' in the description and claims is to be interpreted as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown.

This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
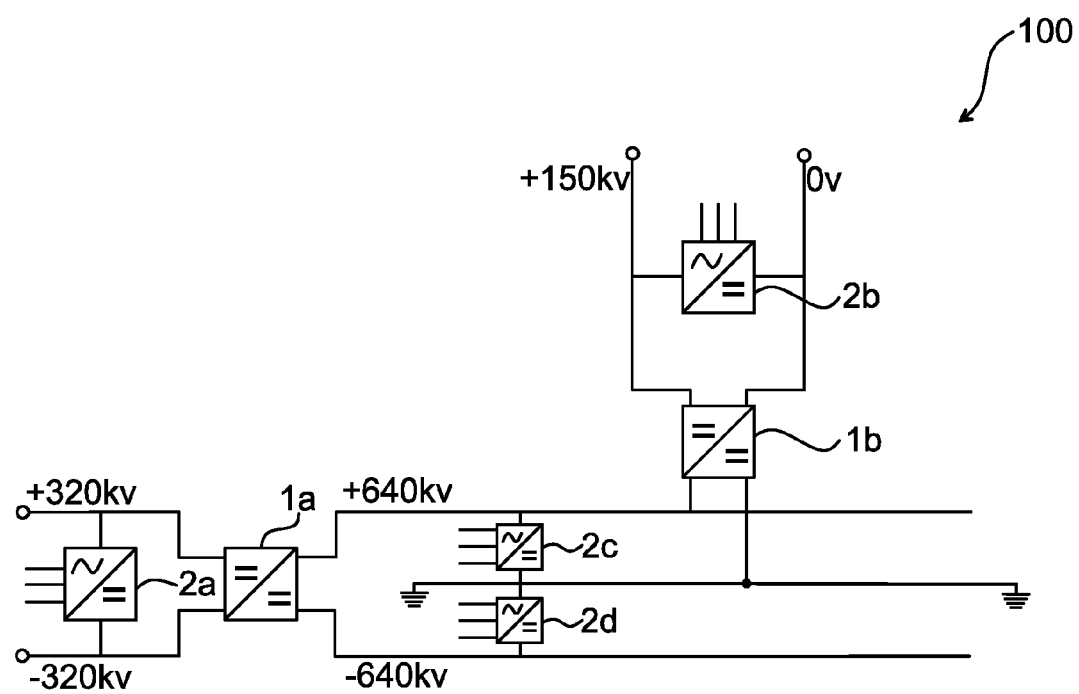
FIG. 1 is a schematic illustration of an HVDC transmission system.

FIG. 1 is a schematic illustration of an HVDC transmission system. FIG. 1 illustrates an example of an HVDC transmission system 100, where four separate DC networks exist. On the left of FIG. 1, there is a +−320 kV monopolar system, where an AC/DC converter 2a is used to convert DC to and/or from AC.

On the middle right of FIG. 1, there is a bipolar +−640 kV system. Here, two AC/DC converters 2c-d are used to convert DC to and/or from AC. Between the +−320 kV monopolar system and the +−640 kV bipolar system there is a high voltage DC/DC converter 1a, which can be unidirectional or bidirectional.

On the top right of FIG. 1, there is an asymmetrical monopolar +150 kV system connected to the positive transmission line and ground of the +−640 kV bipolar system via a high voltage DC/DC converter 1b. An AC/DC converter 2b is used to convert DC to and/or from AC.

Figure 2A:
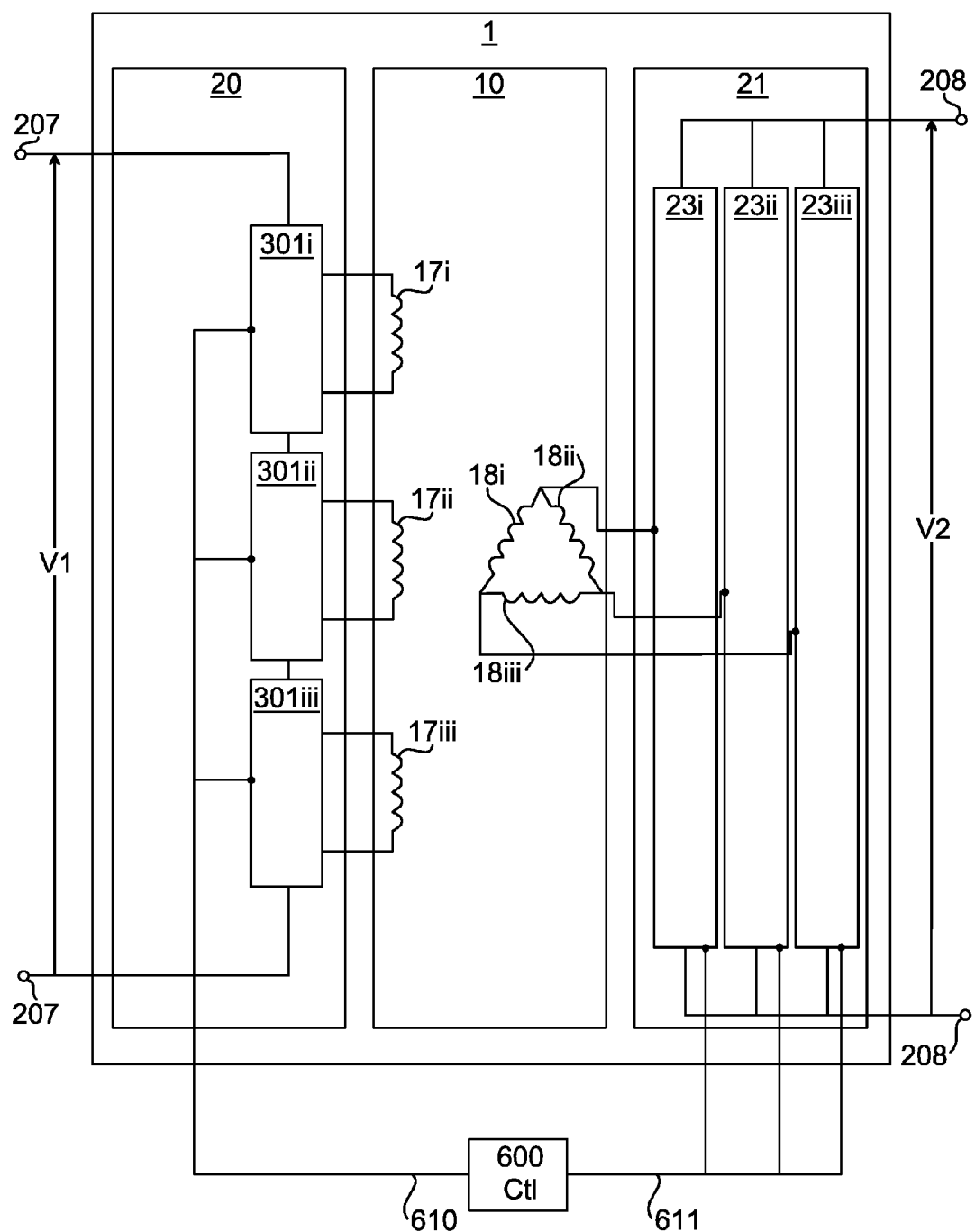
FIGS. 2A-B are schematic illustrations of two embodiments of a high voltage DC/DC converter as illustrated in FIG. 1.

FIG. 2A is a schematic illustration of a high voltage DC/DC converter 1 as illustrated in FIG. 1. The high voltage DC/DC converter 1 can be used for all of the high voltage DC/DC converters 1a-b of FIG. 1. On one side, the high voltage DC/DC converter 1 has a first set 207 of DC terminals connected to a DC connection with voltage V1. On the other side, the high voltage DC/DC converter 1 has a second set 208 of DC terminals connected to a DC connection with voltage V2. The high voltage DC/DC converter 1 converts DC power between the first set 207 of DC terminals to the second set 208 of DC terminals in either or both directions.

The high voltage DC/DC converter 1 comprises a first converter 20 capable of converting from DC to AC and a second converter 21 capable of converting from AC to DC. The first and second converters 20, 21 are connected on their respective AC sides to a multiphase transformer device 10. The high voltage DC/DC converter 1 can thus transform power from one voltage to another by converting DC power to multiphase AC, via a transformer and back to DC. Moreover, the transformer provides isolation of some faults occurring on one side of the transformer from the other side. The signal on the different phases are shifted from each other in phase angles. E.g. in the case that there are three phases, the phases are respectively shifted 120 degrees.

The multiphase transformer 10 device comprises a plurality of primary windings 17$i$-$iii$ and a corresponding plurality of secondary windings 18$i$-$iii$. While it is here shown an AC section of the high voltage DC/DC converter with three phases, any suitable number of phases can be selected, as long as there are at least two. Moreover, as will be appreciated by the skilled person, the illustration of the multiphase transformer device 10 is very schematic and the actual layout, particularly of the windings 17$i$-$iii$, 18$i$-$iii$ will most likely differ in implementation from what is shown here. The multiphase transformer device 10 can consist of a single multiphase transformer or a plurality of single phase transformers.

The first converter 20 comprises a plurality of phase legs 301$i$-$iii$, serially connected between the first set 207 of DC terminals. Each phase leg 301$i$-$iii$ is connected to an AC connection of a respective primary winding 17$i$-$iii$, each AC connection comprising first and second AC connection terminals.

The second converter 21 comprises a plurality of bridge legs 23$i$-$iii$ connected in parallel between the second set 208 of DC terminals. Each one of the bridge legs 23$i$-$iii$ is connected to a respective AC connection terminal of the secondary windings 18$i$-$iii$ of the multiphase transformer 10. It is to be noted that the bridge legs 23$i$-$iii$ correspond to phases, just like the phase legs of the first converter 20. However in order to be able to easily distinguish between the converter legs in the text herein, the converter legs of the first converter 20 are denoted phase legs 301$i$-$iii$ and the converter legs of the second converter 21 are denoted bridge legs 23$i$-$iii$.

A controller 600 is connected to the phase legs 301$i$-$iii$ via a first control connection 610 and to the bridge legs 23$i$-$iii$ via a second control connection 611.

The controller can implement any one or more of a number of control strategies.

In particular, the first converter 20 could be controlled to provide a defined voltage and frequency to the primary windings 17$i$-$iii$. This is similar to the strategy used for a converter feeding a passive AC grid.

Moreover, the second converter could be controlled either to keep a constant DC side voltage (V2) or to maintain a defined active power flow in either direction. If a constant DC side voltage is maintained, the active power flow will be determined by other converters connected to the DC terminals 207, 208, e.g. AC/DC converters 2a-f of FIG. 1.

The ratio between V1 and V2 is defined by a selection of the following parameters:

number of phase legs 301$i$-$iii$ in the first converter 20 series connected phases turns ratio of the multiphase transformer 10 device AC voltage magnitude of the first converter 20, which is defined by the modulation index of the first converter 20. By keeping the modulation index and thus AC voltage magnitude high, losses related to a lower current for a given active power level are reduced AC voltage magnitude of the second converter 21, which is defined by the modulation index of the second converter 21. By keeping the modulation index and thus AC voltage magnitude high, losses related to a lower current for a given active power level are reduced.

If the high voltage DC/DC converter 1 is configured to be unidirectional, control is performed by controlling the AC voltage magnitude of the first converter 20.

The control strategy alternatives defined above can also be used in reverse, such that second converter 21 is controlled as described for the first converter 20 above, and vice versa.

Figure 2B:
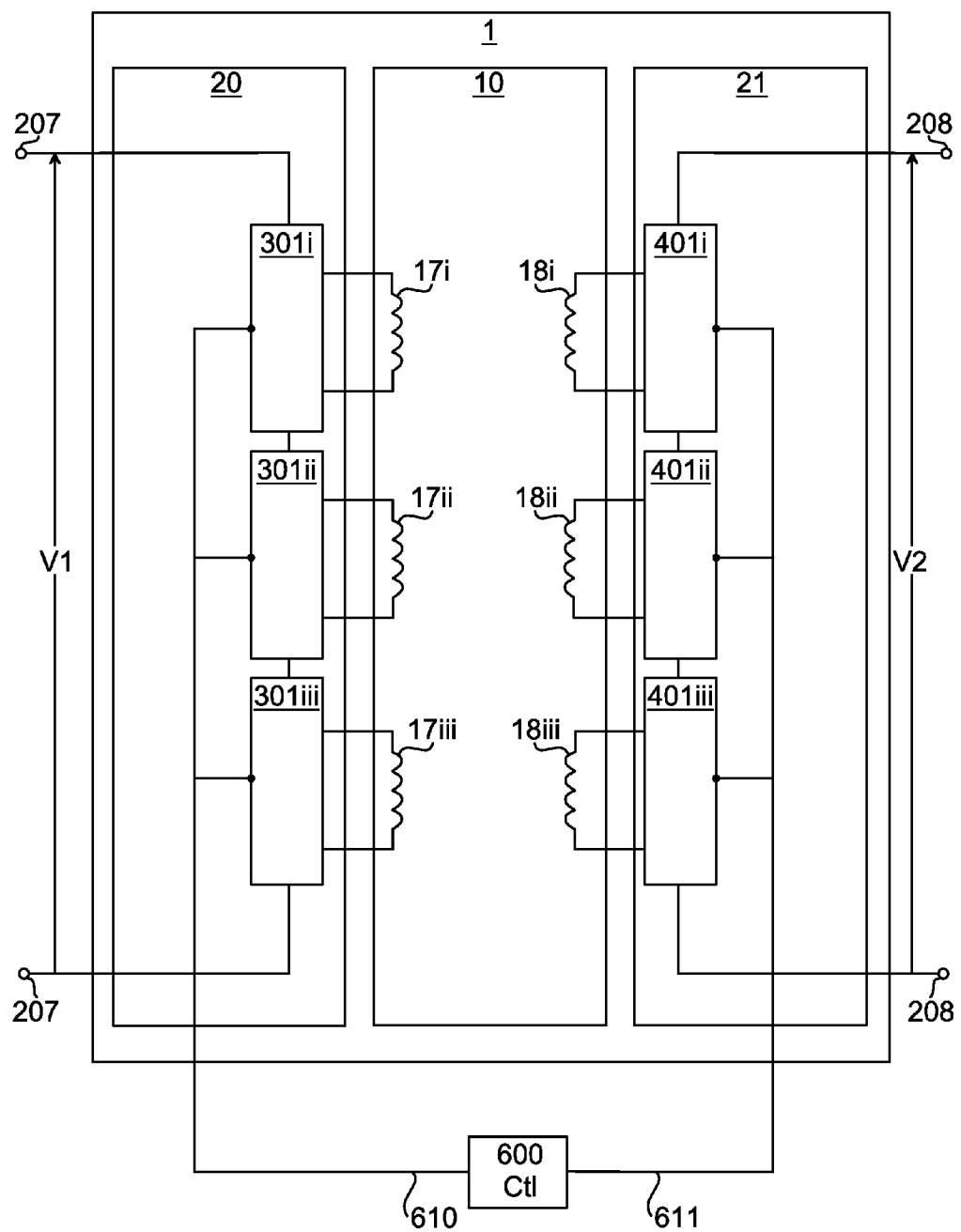

FIG. 2B is a schematic illustration of one embodiment of a high voltage DC/DC converter 1 as illustrated in FIG. 1. Here, the second converter 21 comprises a plurality of phase legs 401*i-iii*, serially connected between the second set 208 of DC terminals. Each phase leg 401*i-iii* is connected to an AC connection of a respective secondary winding 18*i-iii*, each AC connection comprising first and second AC connection terminals.

The controller 600 is connected to the phase legs 301*i-iii* of the first converter 20 via a first control connection 610 and to the phase legs 401*i-iii* of the second converter 21 via a second control connection 611.

Figure 3:
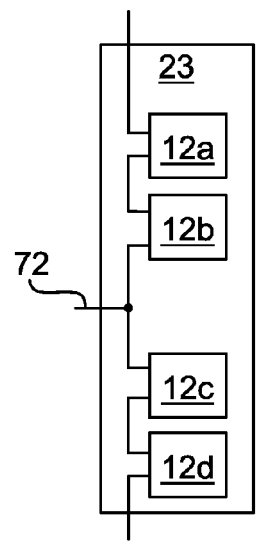
FIG. 3 is a schematic illustration of a phase leg of a converter for converting from AC to DC of FIG. 2.

FIG. 3 is a schematic illustration of a bridge leg 23 of the second converter 21 of FIG. 2A. The bridge leg 23 can be used for all of the bridge legs 23*i-iii* of the second converter 21 of FIG. 2A. The bridge leg 23 comprises a number of converter cells 12*a-d*. In this example, two converter cells 12*a-b* are connected in series between one of the DC terminals 208 of the second converter and an AC connection 72 for connection with an AC connection terminal of the secondary winding of the multiphase transformer 10 device. Analogously, two converter cells 12*c-d* are connected in series between the other of the DC terminals 208 of the second converter and the AC connection 72. More converter cells can be added in series to support higher voltage and/or in parallel to support higher current. More converter cells in series also improve the voltage waveform quality, which thus reduces the need for additional components for filtering.

Figures 4A, 4B:
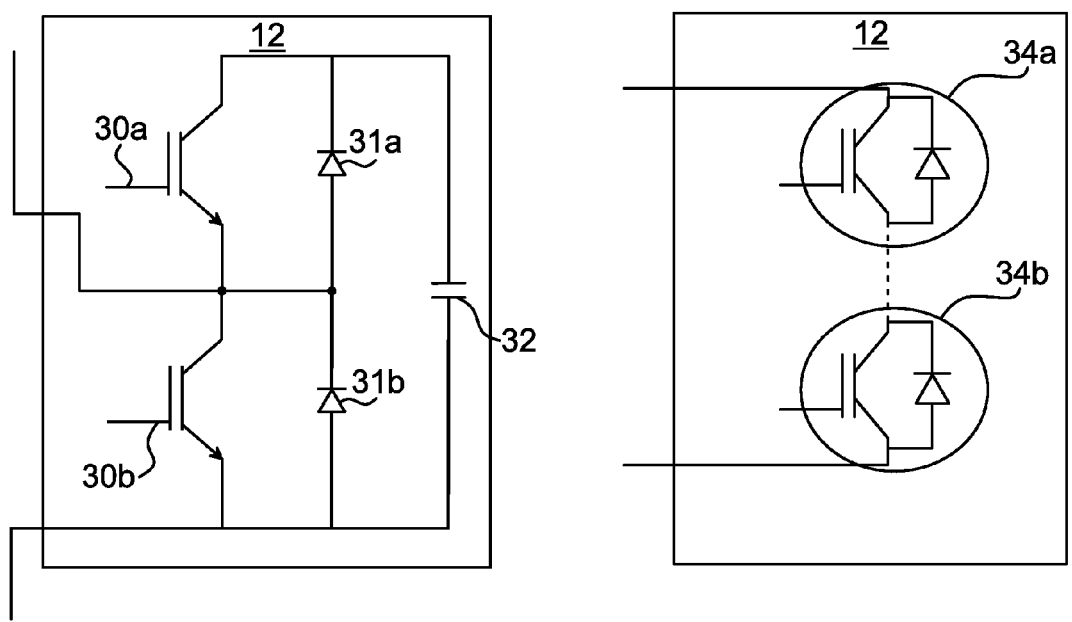
FIG. 4A is a schematic diagram showing a converter cell of the converter of FIG. 3 according to a first embodiment.
FIG. 4B is a schematic diagram showing a converter cell of the converter of FIG. 3 according to a second embodiment.

FIG. 4A is a schematic diagram showing a converter cell 12 of the converter of FIG. 3 according to a first embodiment. The converter cell 12 can be used for all of the converter cells 12*a-d* of the bridge leg 23 of FIG. 3.

The converter cell 12 is here implemented using a half bridge cell comprising two transistors 30*a-b*, e.g. insulated-gate bipolar transistors (IGBTs), Integrated Gate-Commutated Thyristor (IGCT), a Gate Turn-Off thyristor (GTO), etc., connected serially. Two diodes 31*a-b* are each connected in parallel with a respective one of the transistors 30*a-b*. A capacitor 32 is also provided in parallel across both transistors 30*a-b* and both diodes 31*a-b*.

A converter cell is a combination of semiconductor switches, such as transistors, and optionally energy storing elements, such as capacitors, supercapacitors, inductors, batteries, etc. Optionally, a cell can be a multilevel converter structure such as a flying capacitor or NPC multilevel structure.

FIG. 4B is a schematic diagram showing a converter cell 12 of the converter of FIG. 3 according to a second embodiment. The converter cell 12 can be used for all of the converter cells 12*a-d* of the bridge leg 23 of FIG. 3. When using this type of cell without an internal capacitor, an external DC capacitor can be provided across the DC side (between terminals 208 of FIG. 2A)

The converter cell 12 is here implemented using a plurality of serially connected transistors 34*a-b*, e.g. insulated-gate bipolar transistors (IGBTs), as well as optional auxiliary components, such as resistors, capacitors etc. in snubber configurations (not shown). In such a structure, all IGBTs are connected in series and share the voltage. In contrast, in the half bridge structure of FIG. 4A, only half of the IGBTs are used to share the voltage. In other words, the structure of FIG. 4B only requires half the number of IGBTs compared to the structure of FIG. 4A. Losses will be lower with the structure of 4A compared to 4B due to multi-level configuration allowing a lower switching frequency.

Figure 6A:
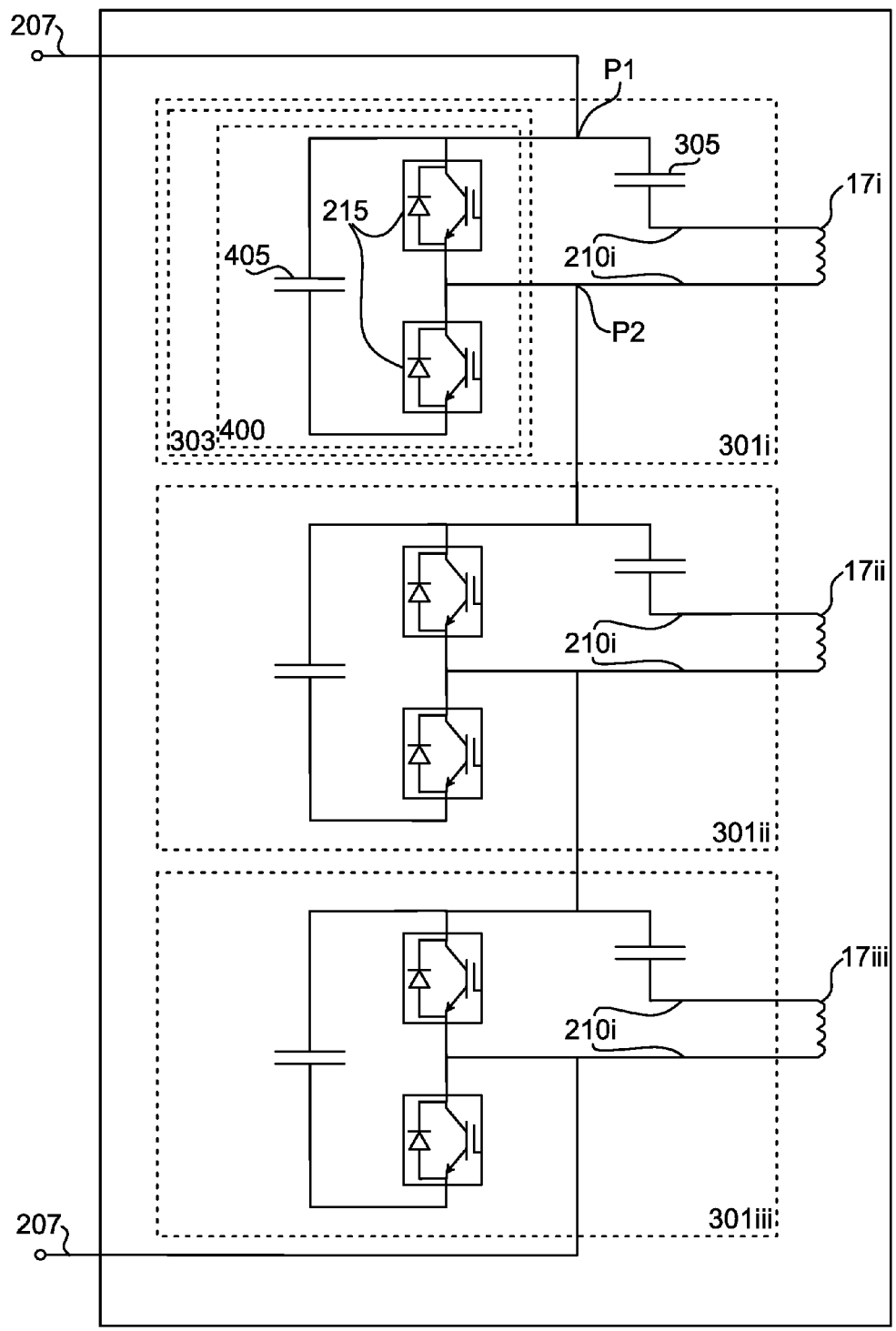
FIG. 6A is a schematic illustration of an embodiment of a first converter according FIG. 5 wherein a phase branch comprises a single converter cell.
Figure 6B:
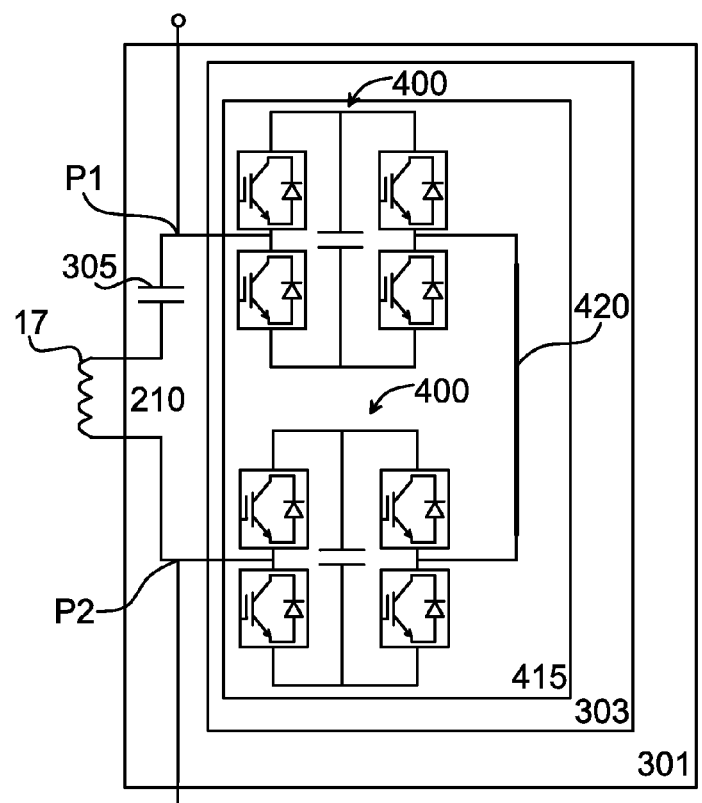
FIG. 6B is a schematic drawing of an embodiment of a phase leg wherein a phase branch comprises a cascade of full bridge converter cells.

Optionally, the converter cell 12 could be implemented using a full bridge cell, e.g. as shown in FIG. 6B for the first converter. By implementing the converter cell 12 as a full bridge cell, the voltage can be reversed. In one embodiment, a combination of half bridges and full bridges are used.

Optionally, the converter cell 12 could be implemented using a passive diode bridge. In such an embodiment, the power flow can only flow in one direction, from the first set 207 of DC terminals through the DC/DC converter to the second set 208 of DC terminals.

Here now follows a more detailed description of the first converter with serially connected phase legs, with reference to FIGS. 5 and 6A-C.

Figure 5:
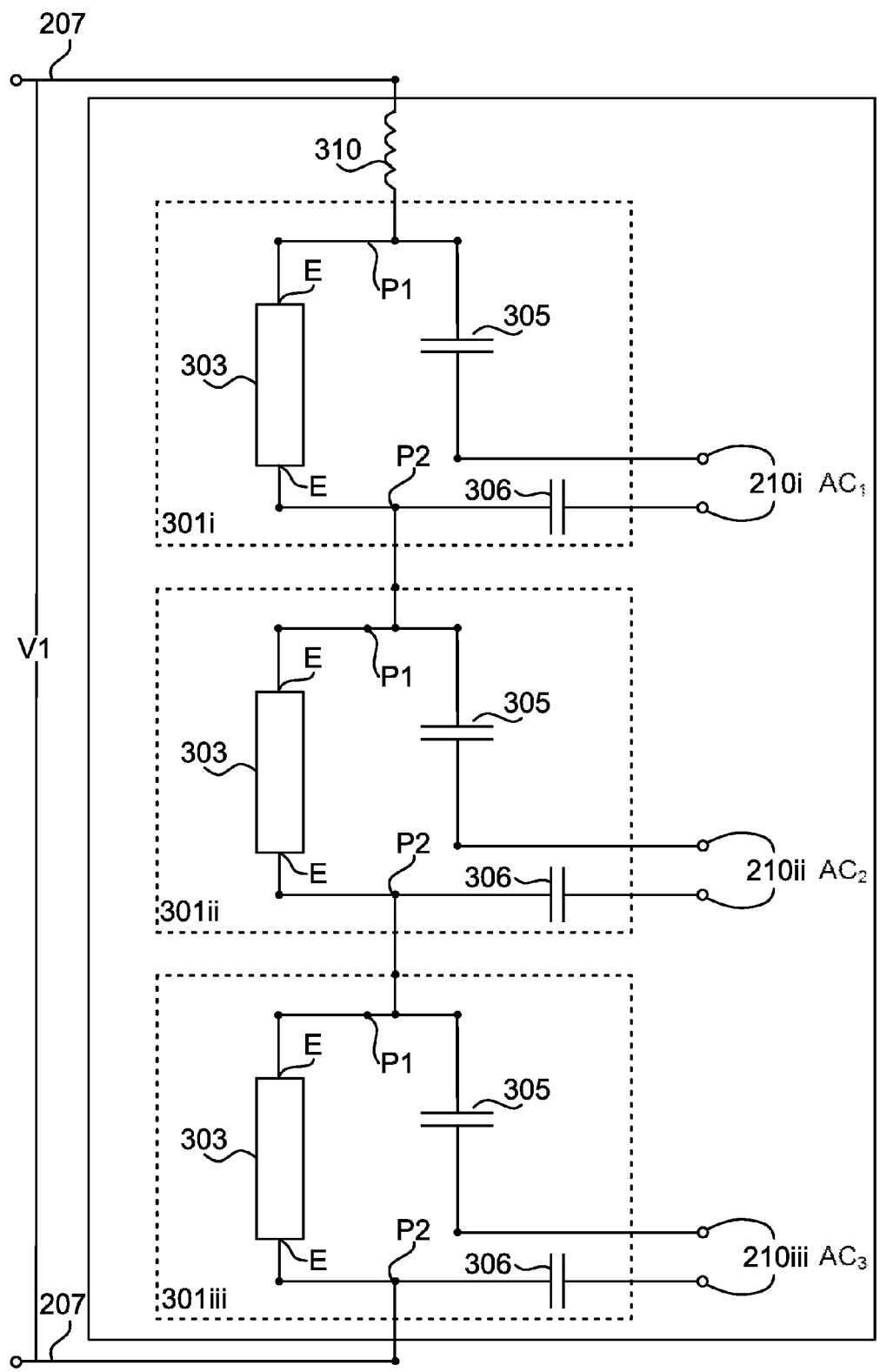
FIG. 5 is a schematic illustration of an example of a first DC converter wherein, for each phase, a DC blocking capacitor is connected in series with the AC connection, such series connection being connected in parallel with a phase branch of converter cells.

FIG. 5 schematically illustrates an example of the first converter 20 of FIG. 2A and FIG. 2B, having three phase legs 301*i*, 301*ii* and 301*iii* which are connected in series on the DC side between two poles of a DC connection 207, 208. The first converter 20 further has one AC connection per phase leg, denoted 210*i*, 210*ii* and 210*iii*, respectively, the AC connection having two AC connection terminals. When referring to any one (or all) of the phase legs 301*i*, 301*ii* and 301*iii*, the common term phase leg 301 will be used; when referring to any one (or all) of the AC connections 210*i*, 210*ii* and 210*iii*, the common term AC connection 210 is used, and so forth.

Each phase leg 301 of FIG. 5 comprises a phase branch 303 having at least one converter cell. A phase branch 303 has two branch end connection terminals E at its respective ends. In each phase leg 301 of the first converter 20 of FIG. 5, the phase branch 303 is connected (via end connection terminals E) in parallel with a series connection of a DC blocking capacitor 305 and the AC connection 210.

The series connection of phase legs 301 between the two terminals of the DC connection 207 is such that a first connection point P1 in a phase leg is located between the first branch end terminal E and the capacitor 305, while a second connection point P2 is located between the second branch end terminal E and the second terminal of AC connection 210. In this way, the phase legs 301 are serially connected also via the AC connections 210. This reduces requirements on valves, whereby e.g. a half bridge structure can be utilised.

A serial phase unit needs a valve voltage rating corresponding to 2*V1/P. Compare this to a parallel converter, where each phase unit has to be able to withstand a voltage rating of 2*V1. Consequently, a factor P (3 in this example) lower total voltage rating is required in the series connected converter. On the other hand, the series connection requires three times higher current rating. However, voltage ratings have higher impact on cost than current rating, whereby component costs are reduced with a serial configuration.

Optionally, a second DC blocking capacitor 306 is provided between the AC connection 210 and the second connection point P2. This ensures that both terminals of the DC connection 207 are only connected via a capacitor 305, 306 to the AC connection 210, and thereby to the windings of the transformer. This implements DC blockage of both terminals of the DC connection 207.

In order to limit any fault currents occurring in an HVDC system to which the first converter 20 is connected, the first converter 20 could for example include a passive filter, including for example a reactor and possibly further components, in series with the phase legs 301 and the poles of the DC connection 207. Such passive filter, formed by a reactor 310, is shown in FIG. 5. A passive filter connected in series with the phase legs 301 and the poles of the DC connection 207 will be referred to as a DC line filter 310, of which reactor 310, referred to as DC line reactor 310, forms one embodiment.

Optionally, reactors or other passive filter components may be included in series with each phase branch 303 and/or capacitor 305.

A phase branch 303 can be formed of a single converter cell, or of a series connection of two or more independently switchable converter cells arranged in a cascaded fashion. By using a cascade of series connected converter cells it is achieved that multiple voltage levels can be obtained at the AC side of a phase leg 301, so that a more smooth synthesis of an AC-voltage can be obtained than if a phase branch 303 formed from a single converter cell is used. Thus, fewer filtering components and lower switching frequency will be required if the phase branch 303 comprises a cascade of converter cells than if a single converter cell is used as the phase branch 303.

The converter cells of a phase branch 303 can be half bridge converter cells, full bridge converter cells, or a combination of half bridge and full bridge converter cells. As described above, a half bridge converter cell comprises two series connected electric valve units 215 forming what may be referred to as a cell element, which is connected in parallel with a cell capacitor in a half bridge configuration. A full bridge converter cell comprises two such cell elements, both connected in parallel with a cell capacitor in a full bridge, or H bridge, fashion. As described above, an electric valve 215 can advantageously include a unidirectional switch, or switch for short, and an anti-parallel diode, where the unidirectional switch can be controlled to switch off, as well as to switch on.

Depending on the switching state of the valves 215 of a converter cell, the voltage across a converter cell can take one of two (half bridge cell) or three (full bridge cell) different values. In a half bridge converter cell, the two values are 0 and +Uc, or 0 and −Uc, (depending on which of two equivalent half bridge topologies is used), where Uc is the voltage across the cell capacitor. In a full bridge converter cell, the three values are +Uc, 0 and −Uc. The switching state of a valve 215 of a converter cell can for example be controlled by sending a switch control signal (e.g. a Pulse Width Modulation (PWM) signal) to the switch of the valve 215. A drive unit is typically provided for sending such switch control signals.

The converter shown in FIG. 5 could also be an example of the second converter of FIG. 2B. One difference from what is shown in that example is that the converter is connected to the second set 208 of DC terminals.

An example of an embodiment of a three-phase first converter 20 wherein a phase branch 303 comprises a single converter cell 400 is shown in FIG. 6A. The converter cells 400 of the first converter 20 shown in FIG. 6A are half bridge cells 400. In the phase leg 301$i$ of the first converter 20 of FIG. 6A, the converter cell 400, the cell capacitor 405 and the two valves 215, each comprising a unidirectional switch and an anti-parallel diode, have been indicated by reference numerals.

Figure 6C:
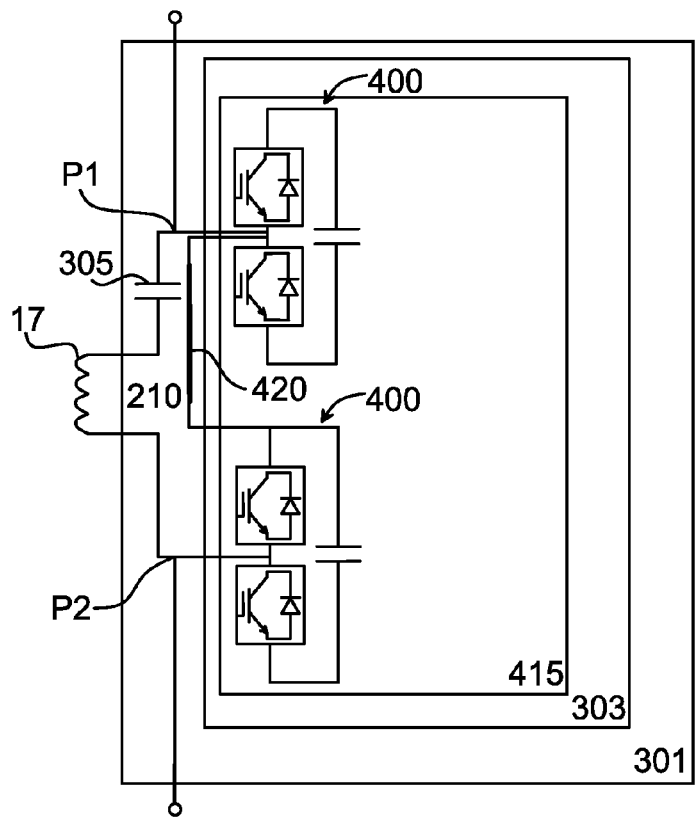
FIG. 6C is a schematic illustration of an embodiment of a phase leg wherein a phase branch comprises a cascade of half bridge converter cells.

In FIGS. 6B and 6C, examples of different embodiments of a phase legs 301 having a phase branch 303 comprising a cascade 415 of independently switchable converter cells 400 are schematically shown. Two or more phase legs 301 as shown in FIGS. 6B and 6C, respectively, could be series connected on the DC side to form a first converter 20. In the example of FIG. 6B, the branch 303 comprises a cascade 415 of full bridge converter cells 400. In FIG. 6C, the branch 303 comprises a cascade 415 of half bridge converter cells 400. In FIGS. 6B and 6C, two converter cells 400 have been shown for each phase branch 303, with a bold line 420 connecting the two converter cells 400, the bold line indicating that further converter cells 400 may be present in the cascade 415. In fact, a cascade 415 could include a series connection of any number N (N≥2) of half bridge converter cells 400, or any number (N≥2) of full bridge converter cells 400, or a combination of half bridge and full bridge converter cells 400.

Contact leads can be connected to a half bridge converter cell 400 according to two different topologies: either across the "top" valve, or across the "bottom" valve. Furthermore, the valves of a half bridge converter cell 400 can be of the same, or different, polarity. In a cascade 415, half bridge cells 400 of the same, or different, topology, and/or of the same, or different, polarity, may be used.

The use of half bridge converter cells 400 of the same topology and same polarity in a phase branch 303 of a first converter 20 is often more cost efficient than to use full bridge converter cells 400, or half bridge converter cells of different topology and/or different polarity, since fewer components are required, and a non-zero switching state of a first polarity is normally sufficient.

As an alternative to the converter cells 400 shown in FIG. 6B-C, a number of IGBTs can be connected in series, as shown in FIG. 4B for the second converter.

In order to improve the current withstanding property of a phase branch 303, two or more cascades 415 could be connected in parallel to form a single phase branch 303. The AC connection 210$i$-$iii$ of each phase leg 301$i$-$iii$ is respectively connected to a primary winding 17$i$-$iii$ of the multiphase transformer device 10.

An electric valve 215 is shown in FIGS. 6A-C to include a unidirectional switch and an anti-parallel diode, where the unidirectional switch can be controlled to switch off, as well as to switch on. A unidirectional switch could for example be an IGBT, an Integrated Gate-Commutated Thyristor (IGCT), a Gate Turn-Off thyristor (GTO), etc. In some implementations, the anti-parallel diode could be integrated in the switch, the switch thus being reverse conducting. Examples of such a reverse conducting switch, which on its own could provide the functionality of a valve 215, are the reverse conducting IGCT and the bi-mode insulated gate transistor (BIGT). Furthermore, an electric valve 215 could comprise more than one switch, connected in series and/or in parallel and arranged to switch simultaneously, and/or more than one anti-parallel rectifying elements.

In FIGS. 6A-C, the connection point P2 has been shown to lie between the AC connection 210 and the end point E of the phase branch 303 towards which the unidirectional switches are capable of conducting current. However, the connection point P2 could alternatively lie between the AC connection 210 and the end point E of the phase branch 303 towards which the unidirectional switches cannot conduct current. In other words, the capacitor 305 could be located on either side of AC the connection 210 in relation to the direction in which the unidirectional switches of the phase branch 303 is capable of conducting current.

The AC voltage drop $U_{305}^{AC}$ across a DC blocking capacitor 305 of a first converter 20 in operation will correspond to:

$$U_{305}^{AC} = \frac{I_{AC}}{2\pi f C_{305}}, \quad (1)$$

where $I_{AC}$ is the magnitude of the AC phase current and $C_{305}$ is the capacitance of the DC blocking capacitor 305. A suitable capacitance $C_{305}$ can for example be selected based on requirements on the AC impedance provided by the capacitor 305 in for example a ground fault scenario, in combination with capacitor manufacturing costs.

The DC blocking capacitor 305 of a phase leg 301 should be designed to withstand at least the expected DC voltage $U_{pkass}^{1}$ (often corresponding to $$\frac{v1}{P})$$

across the DC blocking capacitor 305 in addition to the expected AC voltage component $U_{305}^{AC}$. In a short circuit or earth fault situation in a system of which first converter 20 forms a part, the current through a phase leg 301 could rapidly increase to a considerable value, and could for example reach 10 times the rated AC phase current, where up to half of this current magnitude could be a DC current. Such failure currents could damage the DC blocking capacitor 305 unless this aspect is considered in the design of the HVDC station 301. Damage of the DC blocking capacitor 305 may be costly in terms of outage duration, since a damaged DC blocking capacitor 305 would typically have to be replaced before the HVDC station 301 can operate normally after failure. In order to protect the DC blocking capacitor 305 from excessive over voltages, an arrester (not shown) could be connected in parallel to each of the DC blocking capacitors 305.

It is to be noted that the AC used herein in the power transfer can be sinusoidal or square waveform.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A high voltage DC/DC converter for converting between a first DC side and a second DC side, the high voltage DC/DC converter comprising:
    a first set of DC terminals;
    a second set of DC terminals;
    a multiphase transformer device comprising a plurality of primary windings and a corresponding plurality of secondary windings;
    a first converter arranged to convert DC to AC, comprising a plurality of phase legs serially connected between the first set of DC terminals, wherein each phase leg:
        comprises a plurality of converter cells;
        is connected to an AC connection of a respective primary winding;
        comprises a first AC connection terminal and a second AC connection terminal; and
        comprises a phase branch comprising at least two converter cells, and having first and second branch end terminals;
    a second converter arranged to convert AC from the secondary windings to DC on the second set of DC terminals; and
    each phase leg of the first converter comprising a capacitor, wherein:
        the capacitor is connected between the first branch end terminal and the first AC connection terminal, the capacitor forming a DC blocking capacitor;
        the second AC connection terminal is connected to the second branch end terminal; and
        the series connection of the phase legs between the first set of DC terminals is such that a first series connection point in a phase leg is located between the first branch end terminal and the DC blocking capacitor, while a second series connection point is located between the second branch end terminal and the second AC connection terminal, and the second series connection point of one of the phase legs is directly connected to the first series connection point of another one of the phase legs that is immediately after the one of the phase legs.

2. The high voltage DC/DC converter according to claim 1, wherein the second converter comprises a plurality of bridge legs connected in parallel between the second set of DC terminals, wherein each bridge leg is connected to a respective AC connection terminal of the plurality of secondary windings.

3. The high voltage DC/DC converter according to claim 1, wherein the second converter comprises a plurality of phase legs serially connected between the second set of DC terminals, wherein each phase leg is connected to an AC connection of a respective secondary winding.

4. The high voltage DC/DC converter according to claim 1, wherein the second converter is controllable to provide a constant DC voltage.

5. The high voltage DC/DC converter according to claim 1, wherein the first converter is controllable to provide a defined voltage and frequency to the primary windings.

6. The high voltage DC/DC converter according to claim 1, wherein the DC/DC converter is reversible, allowing bidirectional power transfer.

7. The high voltage DC/DC converter according to claim 1, wherein each phase branch of each phase leg of the first converter comprises a cascade of at least two series connected and independently switchable converter cells.

8. The high voltage DC/DC converter according to claim 7, wherein the phase branch of each phase leg of the second converter comprises at least two parallel connected cascades of converter cells.

9. A high voltage DC/DC converter for converting between a first DC side and a second DC side, the high voltage DC/DC converter comprising:
    a first set of DC terminals;
    a second set of DC terminals;
    a multiphase transformer device comprising a plurality of primary windings and a corresponding plurality of secondary windings;
    a first converter arranged to convert DC to AC, comprising a plurality of phase legs serially connected between the first set of DC terminals, wherein each phase leg:
        comprises a plurality of converter cells;
        is connected to an AC connection of a respective primary winding;
        comprises a first AC connection terminal and a second AC connection terminal; and comprises a phase branch comprising at least two converter cells, and having first and second branch end terminals (E);

a second converter arranged to convert AC from the secondary windings to DC on the second set of DC terminals;

each phase leg of the first converter comprising a capacitor, wherein:

the capacitor is connected between the first branch end terminal and the first AC connection terminal, the capacitor forming a DC blocking capacitor;

the second AC connection terminal is connected to the second branch end terminal;

the series connection of the phase legs between the first set of DC terminals is such that a first series connection point in a phase leg is located between the first branch end terminal and the DC blocking capacitor, while a second series connection point is located between the second branch end terminal and the second AC connection terminal; and each phase branch of each phase leg of the first converter comprises a cascade of at least two series connected and independently switchable converter cells; and a control system configured to control the switching of the converter cells of the phase branch of a phase leg of the first converter to provide a voltage according to the following expression between the first and second series connections points of a phase leg: $U_k = U_k^{DC} + \hat{U}_v^{AC} \sin(\omega t + \Theta_k)$ where k indicates the $k^{th}$ phase leg, $k \in [1,P]$, P being the number of phases of the first converter; $U_k^{DC}$ denotes a predetermined desired DC voltage between the first and second connection points, where $$\sum_{k=1}^{P} U_k^{DC} = U^{DC},$$

$U_{DC}$ being the voltage between the DC connection terminals; $\hat{U}_v^{AC}$ is a desired peak AC voltage between the first and second connection points, t is time, $\omega$ is the desired angular frequency at the AC connection and $\Theta_k$ is the desired phase angle.

10. The high voltage DC/DC converter according to claim 9, wherein the predetermined desired DC voltage corresponds to $$\frac{V1}{P},$$

where V1 is the voltage between the DC connection terminals and P is the number of phases of the first converter.

11. The high voltage DC/DC converter according to claim 1, wherein at least part of the converter cells conform to a half bridge structure.

12. The high voltage DC/DC converter according to claim 1, wherein at least part of the converter cells conform to a full bridge structure.

13. The high voltage DC/DC converter according to claim 2, wherein the second converter is controllable to provide a constant DC voltage.

14. The high voltage DC/DC converter according to claim 3, wherein the second converter is controllable to provide a constant DC voltage.

15. The high voltage DC/DC converter according to claim 2, wherein the first converter is controllable to provide a defined voltage and frequency to the primary windings.

16. The high voltage DC/DC converter according to claim 3, wherein the first converter is controllable to provide a defined voltage and frequency to the primary windings.

17. The high voltage DC/DC converter according to claim 4, wherein the first converter is controllable to provide a defined voltage and frequency to the primary windings.

18. The high voltage DC/DC converter according to claim 2, wherein the DC/DC converter is reversible, allowing bidirectional power transfer.

19. The high voltage DC/DC converter according to claim 3, wherein the DC/DC converter is reversible, allowing bidirectional power transfer.

20. The high voltage DC/DC converter according to claim 4, wherein the DC/DC converter is reversible, allowing bidirectional power transfer.

* * * * *